A. T. BUTTON & S. J. LUNDY.
GANG-PLOW.
No. 179,094. Patented June 27, 1876.
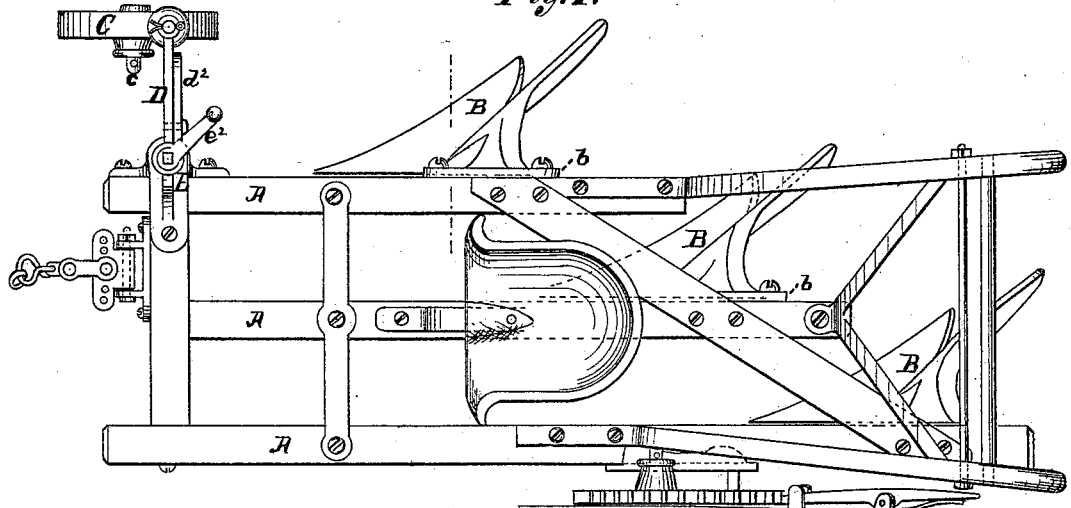
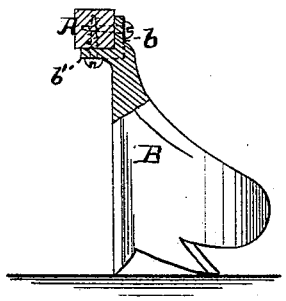
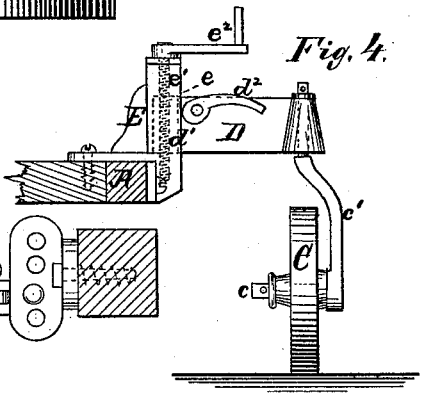
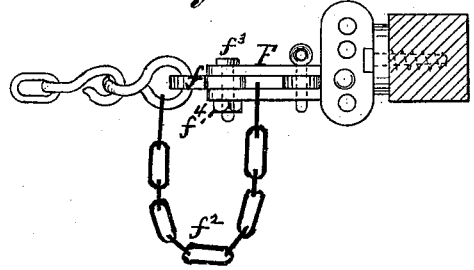
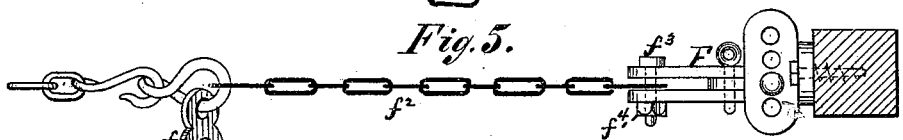
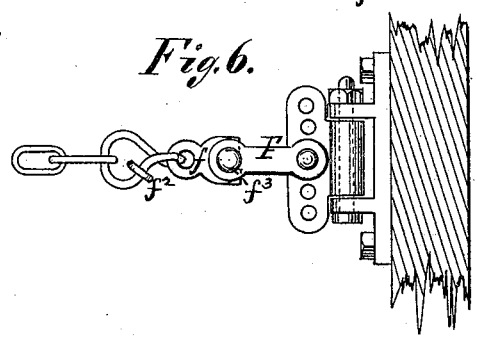
Witnesses:
Henry Eichling
B. S. Clark
Inventor:
Anson T. Button
Samuel J. Lundy
By Fitch & Fitch
Attys.

UNITED STATES PATENT OFFICE.

ANSON T. BUTTON AND SAMUEL J. LUNDY, OF UXBRIDGE, CANADA.

IMPROVEMENT IN GANG-PLOWS.

Specification forming part of Letters Patent No. 179,094, dated June 27, 1876; application filed March 7, 1876.

*To all whom it may concern:*

Be it known that we, ANSON TODD BUTTON and SAMUEL J. LUNDY, both of Uxbridge, county of Ontario, Province of Ontario, in the Dominion of Canada, have invented an Improved Gang-Plow, of which the following is a full, clear, and exact description, reference being had to the accompanying drawings forming part of this specification.

Our invention relates to improvements in and attachments for two-furrow or gang plows; and it consists in the specific devices hereinafter shown and described, and more particularly recited in the claims.

In the drawings, Figure 1 is a plan of a gang-plow embodying our invention. Fig. 2 is a rear view, partly in section, of our improved plow-shares, showing their attachment to the beams. Fig. 4 is a rear view of our improved radial or guide wheel, and showing its attachment to the plow-frame and its method of operation. Figs. 3, 5, and 6 are enlarged detail views of our improved slip draw-clevis for the plow.

A A A are the plow-beams, B B B are the plow-shares. The heads of the plow-shares are formed with the two arms $b$ $b'$, the arm $b$ extending upward perpendicularly on a line with the land-side of the share, and the arm $b'$ extending laterally from the base of the arm $b$ on the land-side. The angle thus formed by these arms forms a seat for the plow-beam A in securing the shares to the beams, as shown in Fig. 2, and by means of the attachment of the shares to the beams, in this manner the land-side of the shares will be on a line, or nearly on a line, with the furrow side of the beam, thus preventing choking, which so frequently occurs in two-furrow and gang plows, as ordinarily constructed. Upon the forward end of the plow-frame, on the furrow side, is arranged the radial or guide wheel C. This wheel turns upon a short shaft or axle, $c$, carried by an arm, $c'$, which extends upward, and works in a swivel-joint in the end of a bar, D, as shown in Fig. 4. This bar D extends laterally from the frame, on the furrow side, sufficiently to bring the guide-wheel into the furrow last plowed, and by thus traveling in the furrow, the wheel guides the plow in its course, and preserves uniformity in the direction of the furrows as plowed. The end of the bar D, where it is joined to the frame, enters a longitudinal slot, $e$, in an upright bracket, E, and is there furnished with a female screw, $d^1$, through which works a male screw, $e^1$, arranged perpendicularly in said bracket, said male screw having bearings in the bracket, and being provided with a crank, $e^2$, on its upper end, as shown. By means of this arrangement the guide-wheel C may be raised or lowered to suit the depth of the furrow in which it travels. A cam-lever, $d^2$, is pivoted upon the bar D, as shown, by which the bar may be held securely at any position upon the male screw, either elevated or depressed. F is our improved slip draw-clevis. This clevis is secured, as shown, upon the front of the plow-frame, and is formed, as shown in Fig. 5, with the key $f$, having the rearward-opening slot $f^1$, attached to one end of the chain $f^2$, the other end of said chain being caught between the upper and lower bars of the clevis, back of the clevis-bolt $f^3$, as shown. The said clevis-bolt is provided with a nut, $f^4$, as shown.

To adjust the clevis for drawing, the key $f$ is placed between the bars, as shown, with its rearward open slot embracing the bolt $f^2$, when the nut $f^4$ is turned down upon the bolt sufficiently tight to hold the key $f$ between the said bars by the pressure thus exerted during the operation of drawing the plow in unobstructed soil. When any one or more of the shares strike an obstruction, the force exerted by the sudden stopping of the plow will cause the key $f$ to be instantly withdrawn from the bolt $f^3$ by the pull of the team, thus permitting the team to continue moving the length of the chain $f^2$, the last link of which will be brought against the bolt $f^3$, as shown in Fig. 5. By this means the plow will be stopped in its course, and no liability to break it incurred, and at the same time the driver will have time, during the onward course of the team through the length of the chain, to stop the team, while the team will not be wholly disengaged from the plow.

We do not intend to claim, broadly, herein an L-shaped knee-joint on the plow-share, adapted to form a seat for the beam, as we are aware that such joint is not new. The essential feature in this regard is the arm $b$, when extending upward perpendicularly from the shares on a line with and directly over the land-side of the share, together with the arm $b'$, extending laterally from the base of the arm $b$ on the land-side of the share, whereby when the plow-beam is secured in the seat thus constituted, the land-side of the share will be on a line with the furrow side of the beam, thus preventing the choking of the share, so frequent in plows as ordinarily constructed, with the land-side of the share wholly under or on the land-side of the beam.

Having thus described our invention, what we claim as our invention, and desire to secure by Letters Patent, is—

1. In a plow, the shares B, having the arms $b$ and $b'$, the former extending upward perpendicularly from and on a line with, and directly over the land-side of the share, and the latter extending laterally from the base of the former on the land-side of the share, whereby when the beam A is secured in the seat thus constituted on the share, the land-side of the share will be on a line with the furrow side of the beam, as described, and for the purpose specified.

2. In a gang-plow, the combination of the guide-wheel C on axle $c$, carried by swivel-arm $c'$, the bar D, with its female screw $d^1$, the slotted upright bracket F, male screw $e^1$, crank $e^2$, and cam-lever $d^2$, all arranged to operate as and for the purpose specified.

3. In a gang-plow, the slip draw-clevis F, having the key $f$, with its rearward-opening slot $f^1$, the chain $f^2$, bolt $f^3$, and nut $f^4$, arranged to operate as and for the purpose specified.

A. T. BUTTON.
S. J. LUNDY.

Witnesses:
 H. M. HOWELL,
 CHAS. H. WIDDEFIELD.